United States Patent
Song et al.

(10) Patent No.: US 11,466,989 B2
(45) Date of Patent: Oct. 11, 2022

(54) TECHNIQUES FOR INDOOR POSITIONING

(71) Applicant: INDUSTRY ACADEMY COOPERATION FOUNDATION OF SEJONG UNIVERSITY, Seoul (KR)

(72) Inventors: Jin Woo Song, Seoul (KR); Yong Hun Kim, Seoul (KR); Eung Ju Kim, Cheonan-si (KR); Min Jun Choi, Suwon-si (KR); Do Hoang Viet, Seoul (KR)

(73) Assignee: INDUSTRY ACADEMY COOPERATION FOUNDATION OF SEJONG UNIVERSITY, Seoul (KR)

(*) Notice: Subject to any disclaimer, the term of this patent is extended or adjusted under 35 U.S.C. 154(b) by 0 days.

(21) Appl. No.: 17/086,467

(22) Filed: Nov. 2, 2020

(65) Prior Publication Data

US 2021/0140770 A1    May 13, 2021

(30) Foreign Application Priority Data

Nov. 8, 2019   (KR) .................. 10-2019-0142971

(51) Int. Cl.
   *G01C 21/08*   (2006.01)
   *G01C 21/20*   (2006.01)
   *G01C 21/00*   (2006.01)

(52) U.S. Cl.
   CPC .......... *G01C 21/08* (2013.01); *G01C 21/005* (2013.01); *G01C 21/206* (2013.01)

(58) Field of Classification Search
   CPC ..... G01C 21/08; G01C 21/005; G01C 21/206
   See application file for complete search history.

(56) References Cited

U.S. PATENT DOCUMENTS

| 2012/0143495 A1* | 6/2012 | Dantu .................. G01C 21/206 701/428 |
| 2013/0179075 A1* | 7/2013 | Haverinen ............ G01S 5/0257 701/525 |

(Continued)

FOREIGN PATENT DOCUMENTS

| DE | 102015205097 A1 * | 7/2016 | ........... G01C 21/206 |
| EP | 2602590 A1 * | 6/2013 | ........... G01C 21/206 |

(Continued)

OTHER PUBLICATIONS

Notice of Allowance dated Apr. 8, 2021 from the Korean Intellectual Property Office for Korean Application No. 10-2019-0142971 and its English translation.

(Continued)

*Primary Examiner* — Mischita L Henson
(74) *Attorney, Agent, or Firm* — Insight Law Group, PLLC; Seung Lee

(57) ABSTRACT

A method is described in which a plurality of magnetic field norms is obtained using a plurality of magnetic field sensor units, each of the plurality of magnetic field sensor units being arranged to measure a magnetic field at a different height while being mounted to an object, each of the plurality of magnetic field norms being a norm of the magnetic field measured by a corresponding one of the plurality of magnetic field sensor units; and the plurality of magnetic field norms is matched with a magnetic field map of an indoor area including a plurality of sub-areas to estimate a location of the object as one of the plurality of sub-areas.

10 Claims, 8 Drawing Sheets

(56) References Cited

U.S. PATENT DOCUMENTS

| | | | |
|---|---|---|---|
| 2015/0260524 A1* | 9/2015 | Haverinen | H04W 4/80 455/456.1 |
| 2016/0084659 A1* | 3/2016 | Yang | G01C 21/206 702/150 |
| 2016/0238395 A1* | 8/2016 | Boukallel | G01C 19/00 |
| 2017/0184402 A1 | 6/2017 | Suzuki | |

FOREIGN PATENT DOCUMENTS

| | | | |
|---|---|---|---|
| JP | 2014171907 A * | 9/2014 | G01V 3/08 |
| KR | 10-2013-0025484 A | 3/2013 | |
| KR | 10-2013-0063821 A | 6/2013 | |
| KR | 10-2013-0126315 A | 11/2013 | |
| KR | 10-2015-0040140 A | 4/2015 | |
| WO | WO-2014172792 A1 * | 10/2014 | G09B 29/106 |

OTHER PUBLICATIONS

Yong Hun Kim et al., "Magnetic-Map-Matching-Aided Pedestrian Navigation Using Outlier Mitigation Based on Multiple Sensors and Roughness Weighting", Sensors 2019, 19, 4782, Nov. 3, 2019.

* cited by examiner

TECHNIQUES FOR INDOOR POSITIONING

CROSS-REFERENCE TO RELATED APPLICATIONS

This application claims the benefit of and priority to Korean Patent Application No. 10-2019-0142971, filed on Nov. 8, 2019, the content of which is herein incorporated by reference in its entirety.

FIELD

The present disclosure relates to techniques for indoor positioning and, more particularly, to techniques for indoor positioning using multiple magnetic field sensors.

BACKGROUND

With the growing application of navigation systems, there is increased activity in research on techniques of obtaining location information indoors for the purpose of, e.g., personal navigation.

For example, various positioning approaches have been developed, including: employing a Light Detection And Ranging (LiDAR) sensor for in-room localization; detecting an indoor position based on a wireless signal such as a Wireless Fidelity (Wi-Fi) signal or a Bluetooth signal; estimating an indoor location by utilizing an Inertial Measurement Unit (IMU) in a Pedestrian Dead Reckoning (PDR) manner; and so forth. Other indoor positioning approaches, which may be used independently or in conjunction with the foregoing, include techniques for using a magnetic field sensor. As an example of this type of technology, Republic of Korea Patent Application Publication No. 2013-0063821 discloses a magnetic field map-based positioning system for comparing a magnetic field map, indicative of magnetic field values measured in advance at various locations across a previously delimited region, with magnetic field values subsequently measured by a magnetic field sensor.

In particular, this use of the "matching" with the magnetic field map facilitates indoor absolute position measurement. Such magnetic field map matching relies upon the notion that since a building construction, e.g., a steel frame structure of a building, may cause various distortions in measurements of the Earth's magnetic field, also referred to as the "magnetic field of the Earth" or the "geomagnetic field," in that building, and may further be deemed most likely to remain unchanged, measuring the magnetic field at multiple zones of the building could provide information unique to the respective zones in accordance with their distortion characteristics. As such, once the magnetic field map is configured based on the information, it is possible to compare the subsequent measurement-based data against the magnetic field map data to estimate the indoor location.

DETAILED DESCRIPTION

Figure 1:
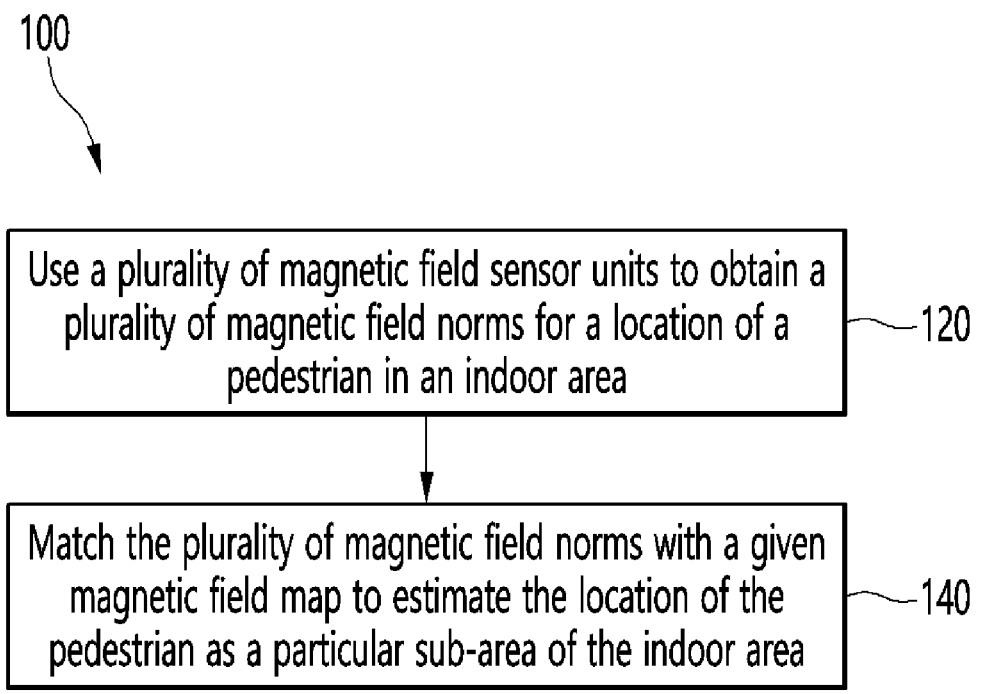
FIG. 1 depicts an example of a process of positioning an object present on an indoor area in accordance with some examples of the present disclosure.

Illustrative examples of the subject matter claimed below will now be described in detail with reference to the accompanying drawings. While examples described herein are susceptible to various modifications and alternative forms, specific examples herein described have been shown by way of example in the drawings. It should be understood, however, that the description herein of specific examples is not intended to limit the disclosure, but on the contrary, the intention is to cover all modifications, equivalents, or alternatives falling within the spirit and scope of the present disclosure. In the following detailed description, numerous specific details are provided to assist in a comprehensive understanding of the examples disclosed herein. However, it will be apparent to one of skill in the art that some of the examples may be practiced without one or more of these specific details. In other instances, descriptions of well-known features may be omitted so as to avoid obscuring various aspects of the present disclosure.

The terminology used in the description is illustrative of a particular example only and is not intended to be interpreted in a restrictive sense. Singular expressions include plural expressions unless expressly stated otherwise. In addition, it should be understood that the term "comprise," "include," "have," or the like, as used herein, specifies the presence of some features, numbers, steps, operations, elements, information, or combinations thereof, but does not preclude the presence or possibility of one or more other features, numbers, steps, operations, elements, information, or combinations thereof.

Overview

A general outline of how to employ a magnetic field sensor to locate an object present on an indoor area will be provided below, followed by a detailed description, with reference to FIG. 1, of an example process 100 of performing indoor positioning using multiple magnetic field sensor units, in accordance with some examples of the present disclosure. In some example implementations, positioning process 100 of FIG. 1 may be performed by a device, such as a portable, wearable, and/or attached electronic device, which can be mounted on, carried by, or fixed to an object, for example, a human being, an autonomous vehicle, a computing device, or the like. In the description set forth below regarding the positioning process 100, it is assumed that, for the purposes of non-limiting illustration, the object to be positioned is a person walking indoors, wearing a magnetic field sensor.

The example indoor positioning technology presented herein involves magnetic field sensor usage in the following two phases for magnetic field map matching. First, a magnetic field map is pre-configured for positioning of an object who or which is present on an indoor area. In this example, the magnetic field map may be configured based on a result of premeasurement of a magnetic field in each sub-area, or "zone," of the indoor area. For example, the premeasurement may be made using a magnetic field sensor unit such as a three-axis magnetic field sensor in, e.g., every grid-shaped zone into which a given area in a building is subdivided. The magnetic field map may be then used to obtain the magnetic field premeasurement-based data for each zone. Next, with the magnetic field map configured as above, and with the object situated in the indoor area and equipped with a magnetic field sensor unit that, for example, has the same arrangement as in the magnetic field premeasurement, a comparison is made between data obtained based on a result of measuring the magnetic field currently on-site, i.e., subsequent to the magnetic field map configuration, and the premeasurement-based data contained in the magnetic field map, such that the location of the object may be estimated to be a particular one of the indoor zones. For example, both pre- and post-map configuration measurement-based data, i.e., the premeasurement-based data and the current measurement-based data, may be in a vector form, and the comparison therebetween may be made by calculating a difference between two vectors, which is defined according to, e.g., a Mean Square Deviation (MSD) scheme. The location estimation, which, as described above, is based on the "matching" of the current measurement-based data with the magnetic field map containing the premeasurement-based data, may be expressed as Eqs. 1 and 2:

$$J = \| M_s(p_k) - M_m(p_m(i, j)) \| \quad \text{Eq. 1}$$

$$\hat{p}_{m,k} = \underset{p_m(i,j)}{\operatorname{argmin}} J \quad \text{Eq. 2}$$

where $p_m(i,j)$ denotes, with index (i,j), zones into which a given indoor area is divided, such as two-dimensional grid-shaped sub-areas of a uniform size, and $M_m(p_m(i,j))$ indicates data which are contained in a magnetic field map $M_m(\bullet)$ and based on premeasurement of a magnetic field in a zone $p_m(i,j)$. For example, the magnetic field map $M_m(\bullet)$ is configured for use in obtaining a norm which is based on the premeasurement of the magnetic field in each zone, such that the data contained in the map may represent the norm itself, e.g., a norm value of a three-dimensional magnetic field vector, or a different quantity, e.g., a three-dimensional magnetic field vector, to be used in calculating the norm. In a particular example, the premeasurement-based data in the magnetic field map may include a norm value calculated from the magnetic field measured per building's zone. However, one of ordinary skill in the art may utilize an otherwise configured magnetic field map to implement an indoor positioning technique in accordance with some examples of the present disclosure, and such implementation would also fall within the scope of the present disclosure. In addition, in Eq. 1, $M_s(p_k)$ denotes data to be matched with the given magnetic field map, which are based on measurement of the magnetic field, at a time point k, at an object's location on the indoor area. In a particular example, with the magnetic field map $M_m(\bullet)$ including the norm of the magnetic field premeasured at each zone as illustrated above, the data $M_s(p_k)$ may include a norm calculated according to, e.g., the same formula as the premeasurement-based norm, from the magnetic field measured at the time point k. Further, according to Eq. 2, the location of the object present in the zone $p_k$ at the time point k may be estimated as the zone $\hat{p}_{m,k}$ that minimizes the cost function J of Eq. 1 from among all the given zones $p_m(i,j)$ having their respective indices (i,j).

Example Indoor Positioning

It is noted that the distortion in the magnetic field measurement may vary depending on the sensor configuration, for example, which part of the object the sensor is attached and arranged on. In this regard, in some example implementations, multiple magnetic field sensor units, rather than a single one, are advantageously used in configuring the magnetic field map, and also in measuring the magnetic field at the current location of the object. For instance, such arrangement may alleviate similarity in the measurements at many different sites, thereby enhancing the accuracy of estimation of an indoor absolute location.

The following provides a detailed description of example indoor positioning process 100 of FIG. 1. For ease of description, consider an example scenario in which the object is a pedestrian on an area in a building, with a sensor attached to his/her foot and another one to his/her waist, where $M_m(p_m(i,j))$ is given for each zone $p_m(i,j)$ as a first multi-dimensional vector, each element of which is a norm of the magnetic field premeasured using a respective magnetic field sensor in that zone, and where $M_s(p_k)$ represents a second multi-dimensional vector, each element of which is a norm of the magnetic field measured using a respective magnetic field sensor at the location $p_k$. In one example, the first vector is $M_m(p_m(i,j))=[M_f(p_m(i,j)) \ M_w(p_m(i,j))]^T$, where $M_f(p_m(i,j))$ and $M_w(p_m(i,j))$ are unnormalized norms of the magnetic field previously measured with the foot-mounted and the waist-mounted magnetic field sensors, respectively. Also, in this example, the norm contained in the second vector is obtained by the same norm calculation as its corresponding norm value, contained in the first vector, of the pre-measured magnetic field.

For this scenario, positioning process 100 is applicable, including: an operation 120 of using a plurality of magnetic field sensor units to obtain a plurality of magnetic field norms for a location of a pedestrian in an indoor area, each magnetic field sensor unit including a magnetic field sensor arranged for measuring, at a different height, e.g., at a foot-height or waist-height, a magnetic field surrounding the pedestrian; and an operation 140 of matching the obtained magnetic field norms with a given magnetic field map to estimate the location of the pedestrian as a particular sub-area of the indoor area.

Figure 2:
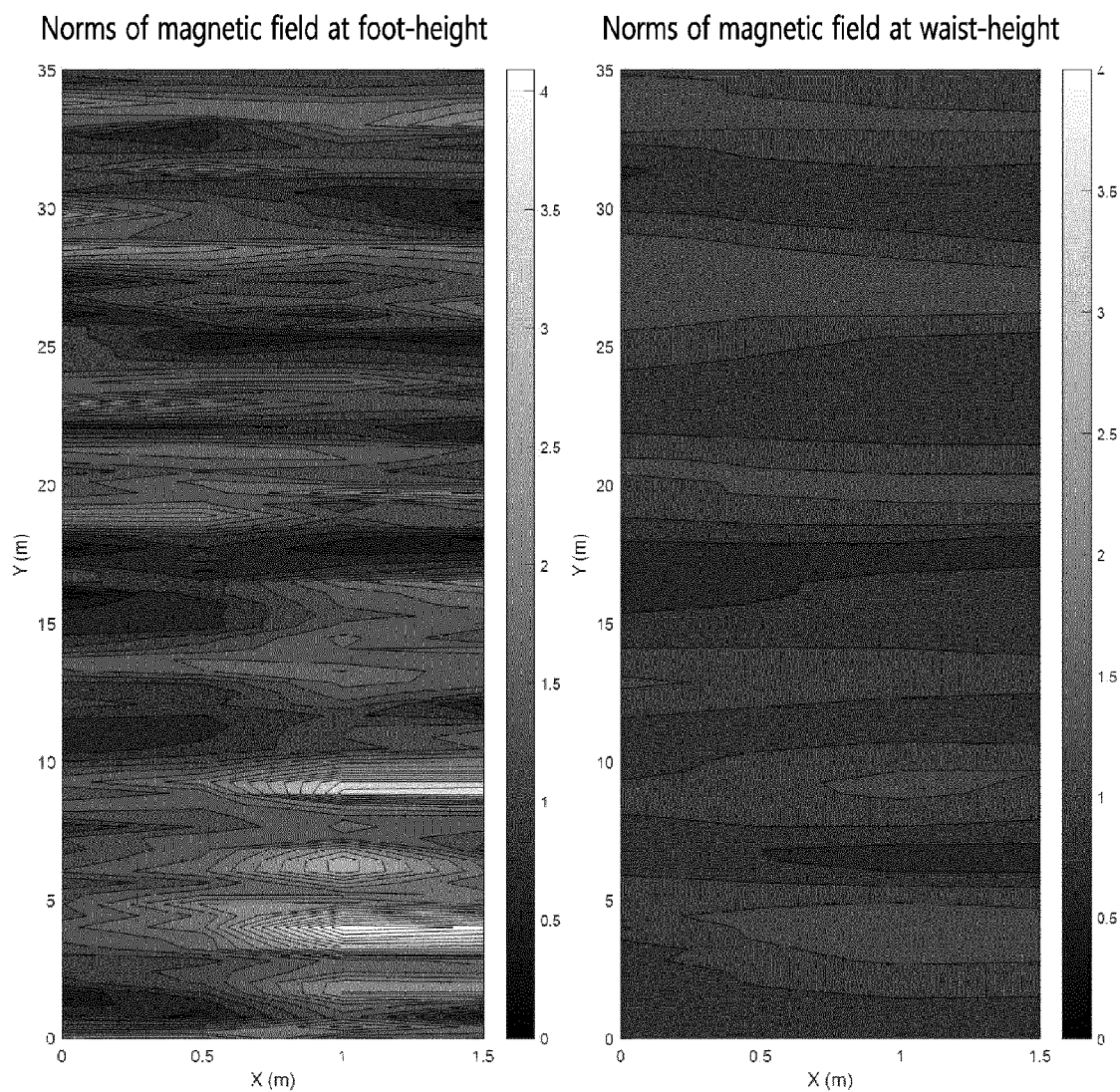
FIG. 2 is a schematic illustration of two example charts, one of which is representative of norms of a magnetic field measured at a height of or slightly above a floor, throughout an indoor area, using a magnetic field sensor mounted to one's foot, and the other of which is representative of norms of the magnetic field measured at a height greater than the above, throughout the area, using a magnetic field sensor mounted to his/her waist, in accordance with some examples of the present disclosure.

The inventive use of multiple magnetic field sensors in operation 120 of the positioning process 100 accounts for the possibility that with the magnetic field map matching based on their resulting multi-dimensional information, as in operation 140, the location may be estimated more accurately than otherwise. Particularly, the use of a single magnetic field sensor merely provides for a scalar value comparison through which the location is estimated with a possibly large number of outliers such as, e.g., a zone which is other than, but similar in measured magnetic field value to, and thus estimated incorrectly as the one in which the object is actually located; however, example positioning process 100 may help mitigate the occurrence of outliers. It is illustrated in FIG. 2 that, for example, over an area in a building within which various steel frame structures are installed, the norm of the magnetic field measured using the foot-mounted magnetic field sensor, that is, the norm of the magnetic field near the floor of the indoor area, has a high value due to an excessive distortion of the magnetic field, while the norm of the magnetic field measured with the waist-mounted magnetic field sensor, that is, the norm of the magnetic field at a greater height than the floor of the indoor area, is of a relatively small magnitude. As such, the arrangement of multiple magnetic field sensors for obtaining magnetic field norms having different characteristics may enhance the accuracy of the location estimation.

The accuracy of the magnetic field map matching-based positioning may increase with an amount of unique data, for example, a count of noticeable norm values, in the magnetic field map. The concept of "roughness" as used herein is intended to represent a degree of uniqueness of data contained in a magnetic field map, meaning that the roughness is defined to be larger for the data corresponding to each zone $p_m(i,j)$ as those data are more prominent on the magnetic field map. In some examples, the uniqueness or prominence of the data corresponding to a certain zone depends upon their difference with the data corresponding to a neighboring zone rather than with those to a more distant zone. For example, provided that any index (i,j) is given as a coordinate representing a location of a two-dimensional grid zone of an area, that is, as $(i,j) \in S_{M \times N}$, where $S_{M \times N}$ is a two-dimensional grid index domain with its size of M×N, it is defined that the magnetic field map $M_m(\cdot)$ exhibits the following roughness $R_u$ for any zone $p_m(i,j)$:

$$R_u(p_m(i,j)) = \frac{1}{MN-1} \left\{ \sum_{(x,y) \in S_{M \times N} - \{(i,j)\}} \frac{\| M_m(p_m(i,j)) - M_m(p_m(x,y)) \|}{\sqrt{(i-x)^2 + (j-y)^2}} \right\} \quad \text{Eq. 3}$$

As indicated above, for each zone $p_m(i,j)$ of the indoor area covered by the magnetic field map, the roughness may be formulated to include a comparison of its corresponding data against those corresponding to each of the remaining zones (see the numerator of Eq. 3) and also a larger weight for its nearer zone (see the denominator of Eq. 3). As such, a magnetic field map which exhibits an increased roughness generally across a given indoor area may result in an improvement of the accuracy of the location estimation, for instance, in view that the data comparison set forth in the numerator of Eq. 3 is similar to the cost function J of Eq. 1.

Figure 3A:
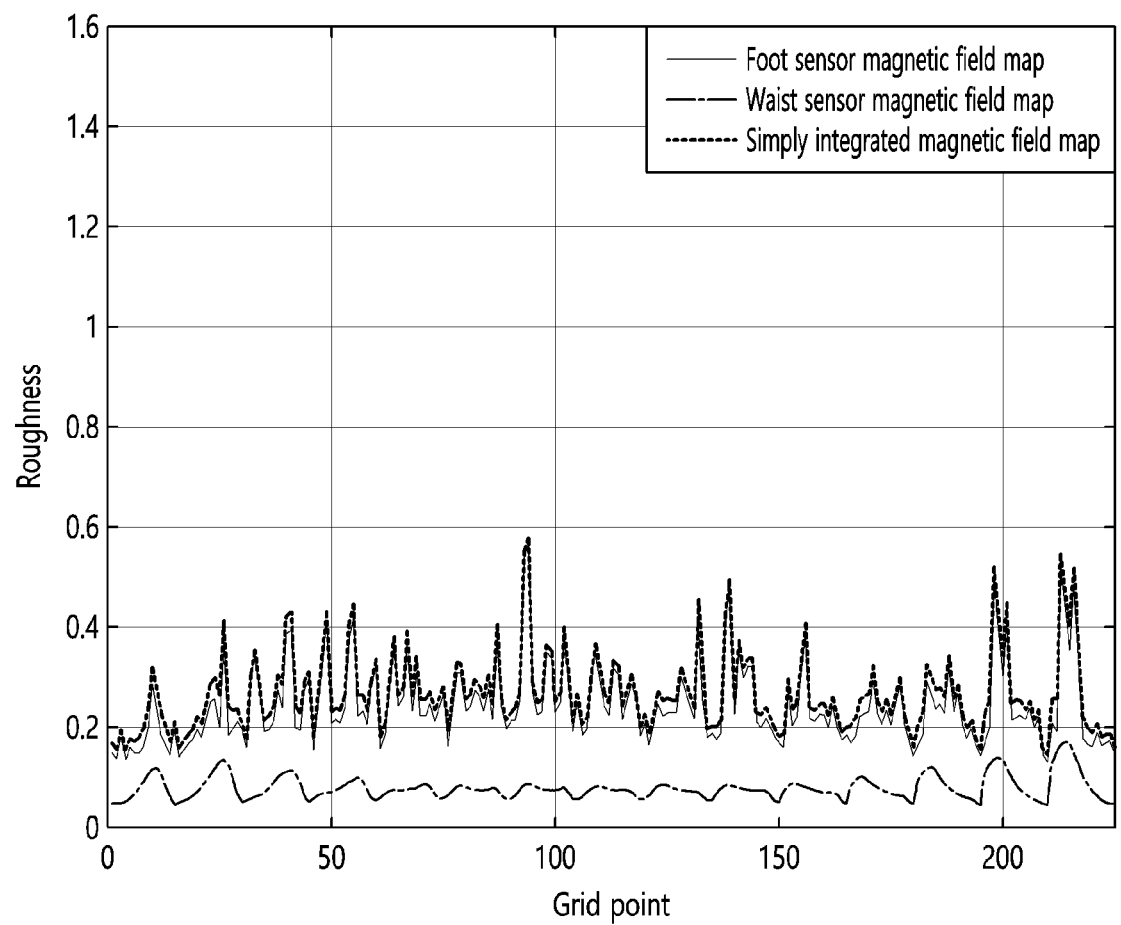
FIG. 3A is an example plot showing, in accordance with an example scenario, roughnesses of: a foot sensor magnetic field map configured using a foot-mounted magnetic field sensor; a waist sensor magnetic field map configured using a waist-mounted magnetic field sensor; and a simply integrated magnetic field map configured as a simple integration thereof.

Although example indoor positioning process 100 uses multiple magnetic field sensors, there might be a certain limit in the roughness increase, and thus in the improvement of the positioning accuracy, if the magnetic field map is a simple integration of its portions, which are respectively pre-configured based on those magnetic field sensors—for example, if the magnetic field map is given by $M_m(p_m(i,j)) = [M_f(p_m(i,j))\ M_w(p_m(i,j))]^T$ for any zone $p_m(i,j)$. This is because if the roughness of one of the magnetic field map portions are much higher overall than that of any other one of the portions, for example, when $M_f(p_m(i,j)) \gg M_w(p_m(i,j))$ for any zone $p_m(i,j)$, as shown in FIG. 3A, the accuracy of the location estimation is not expected to be significantly increased even with the comparison of the multi-dimensional information, instead of a mere scalar value comparison. By way of illustrative example, FIG. 3A shows, for the 255 grid points indicated therein which respectively correspond to 255 (i.e., 15 by 15) grid-shaped zones of the indoor area, the roughnesses given according to Eq. 3 for: a "foot-mounted sensor based magnetic field map portion," or more shortly "foot sensor magnetic field map," which is a shorthand for a magnetic field map configured with norm values of the magnetic field measured using a foot-mounted magnetic field sensor; a "waist-mounted sensor based magnetic field map portion," or more shortly "waist sensor magnetic field map," which is a shorthand for a magnetic field map configured with norm values of the magnetic field measured using a waist-mounted magnetic field sensor; and a "simply integrated magnetic field map," which is a shorthand for a magnetic field map configured as a simple integration thereof. As depicted in FIG. 3A, the roughnesses of the foot-mounted sensor based magnetic field map portion is much larger than that of the waist-mounted sensor based magnetic field map portion, so that the roughnesses of the simply integrated magnetic field map depend mainly upon the foot sensor magnetic field map, rather than the waist sensor magnetic field map.

Figure 3B:
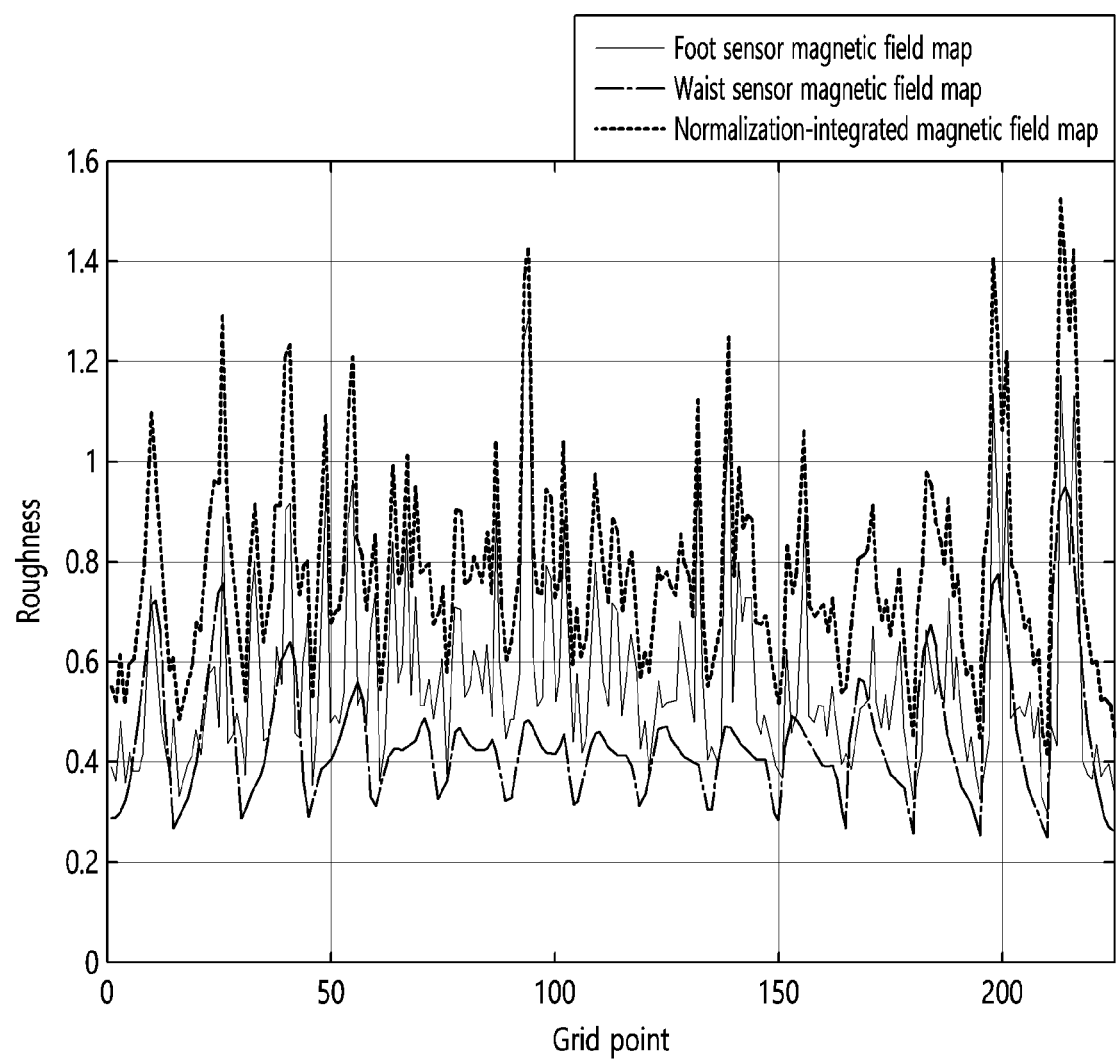
FIG. 3B is an example plot showing, in accordance with an example scenario, roughnesses of: the foot sensor magnetic field map of FIG. 3A with some normalization applied thereto; the waist sensor magnetic field map of FIG. 3A with some normalization applied thereto; and a normalization-integrated magnetic field map configured by integrating the two normalized maps.

As will be discussed below, a particular example provides another magnetic field map for use in location estimation with more accuracy than the simply integrated magnetic field map by more fully leveraging the use of multiple magnetic field sensors. To this end, this example may allow for a modified version of the roughness, which is defined as follows:

$$R_u(p_m(i,j)) = \frac{1}{MN-1} \left\{ \sum_{(x,y) \in S_{M \times N} - \{(i,j)\}} \frac{\| \tilde{M}_m(p_m(i,j)) - \tilde{M}_m(p_m(x,y)) \|}{\sqrt{(i-x)^2 + (j-y)^2}} \right\} \quad \text{Eq. 4}$$

where $\tilde{M}_m(p_m(i,j))$ indicates a normalization of $M_m(p_m(i,j))$. In some example implementations, each of the elements of the magnetic field map $M_m(\cdot)$ may be normalized, with its respective standard deviation, into a corresponding element of $\tilde{M}_m(\cdot)$. In the above-described example scenario, the normalized magnetic field map $\tilde{M}_m(\cdot)$ may be substituted for the non-normalized one $M_m(p_m(i,j)) = [M_f(p_m(i,j))\ M_w(p_m(i,j))]^T$, with the normalization applied by, e.g., multiplying each element of $\tilde{M}_m(\cdot)$ by a reciprocal number of its respective standard deviation, which number serves as a normalization factor, as follows:

$$\tilde{M}_m(p_m(i,j)) = \begin{bmatrix} \sigma_{M_f}^{-1} & 0 \\ 0 & \sigma_{M_w}^{-1} \end{bmatrix} \begin{bmatrix} M_f(p_m(i,j)) \\ M_w(p_m(i,j)) \end{bmatrix} \quad \text{Eq. 5}$$

where $\sigma_{M_f}$ is the standard deviation of the foot sensor magnetic field map, that is, the standard deviation of the norm values of the magnetic field measured using the foot-mounted sensor, and $\sigma_{M_w}$ is the standard deviation of the waist sensor magnetic field map, that is, the standard deviation of the norm values of the magnetic field measured using the waist-mounted sensor. FIG. 3B shows, for the 255 grid points indicated therein which respectively correspond to the above-mentioned 255 (i.e., 15 by 15) grid-shaped zones of the indoor area, the roughnesses given according to Eq. 4 for: the normalized foot sensor magnetic field map, the normalized waist sensor magnetic field map, and an "normalization-integrated magnetic field map," each element of which corresponds to a respective one of those two magnetic field maps. As depicted in FIG. 3B, across the 255 zones, the roughnesses of the normalization-integrated magnetic field map have generally increased values, and also not depend greatly upon either one of the magnetic field map portions. Table 1 shows experimental results of obtaining an average roughness of each of the normalized foot sensor magnetic field map, the normalized waist sensor magnetic field map, and the normalization-integrated magnetic field map, (i.e., obtaining, on average for the zones covered by that map, its respective roughness) for each of four different indoor environments, namely, a huge hall, a basement hall, an elevator lobby corridor, and a narrow corridor.

TABLE 1

| | Roughness (average) | | |
|---|---|---|---|
| Place of experiment | Single sensor (foot) | Single sensor (waist) | Multiple sensors (integration with normalization) |
| Huge hall | 0.5630 | 0.4442 | 0.7824 |
| Basement hall | 0.5537 | 0.4327 | 0.7805 |
| Elevator lobby corridor | 0.3335 | 0.2717 | 0.4747 |
| Narrow corridor | 0.2827 | 0.2923 | 0.4468 |
| Average | 0.4332 | 0.3602 | 0.6211 |

It can be appreciated from Table 1 that in various indoor environments, a normalization-integrated magnetic field map may exhibit its greater roughness using a multiple magnetic field sensor arrangement, as compared to its single sensor-based magnetic field map portions, so that it may contain a smaller amount of similar data and thus bring less ambiguity to the location estimation. Further, instead of the normalization factor that solely takes into account an inverse of a standard deviation, some example implementations may involve tuned normalization of using, as an alternative normalization factor, the inverse multiplied by a tuning factor, with a view to having this normalization evenly representative of the multiple magnetic field sensors, whose measurements are affected by the geomagnetic field and the building construction in the same indoor area. For instance, in the above-described example scenario, Eq. 5 may be modified to incorporate such tuning into the magnetic field map $\tilde{M}_m(p_m(i,j))$, as follows:

$$\tilde{M}_m(p_m(i,j)) = \begin{bmatrix} \alpha \cdot \sigma_{M_f}^{-1} & 0 \\ 0 & \beta \cdot \sigma_{M_w}^{-1} \end{bmatrix} \begin{bmatrix} M_f(p_m(i,j)) \\ M_w(p_m(i,j)) \end{bmatrix} = $$

$$N_g \cdot M_m(p_m(i,j))$$

Eq. 6 where $\alpha$ and $\beta$ are tuning factors which satisfy $\alpha+\beta=1$. These tuning factors may be predefined according to a certain criterion, for example, to decrease the number of outliers as much as possible by, e.g., minimizing the possibility of false location estimation. Hence, in such case, example positioning process 100 may be expressed as the cost function of Eq. 7 and the optimization of Eq. 8:

$$\tilde{J} = \| N_g \cdot M_s(p_k) - \tilde{M}_m(p_m(i,j)) \|$$

Eq. 7

$$\hat{p}_{m,k} = \underset{p_m(i,j)}{\mathrm{argmin}} \tilde{J}$$

Eq. 8

The performance of the indoor positioning as set forth in example process 100 is now discussed.

Figure 4:
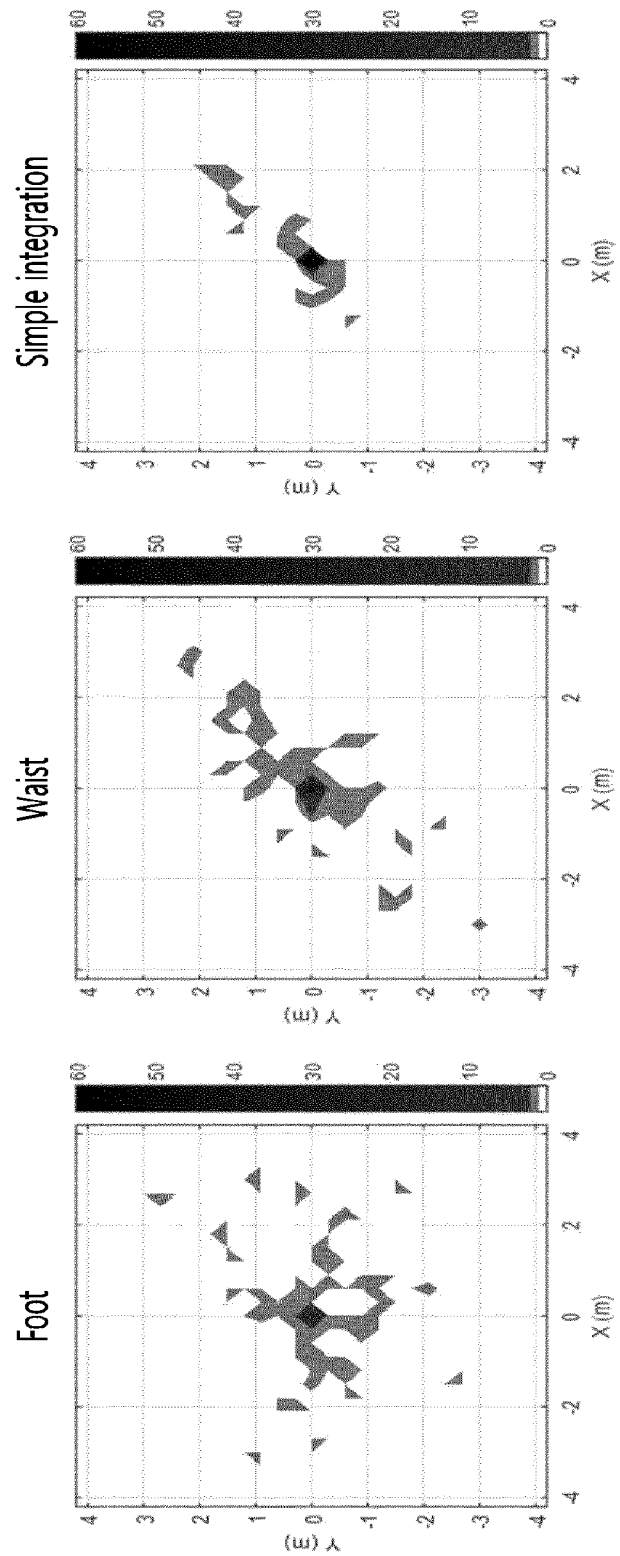
FIG. 4 shows resulting errors in location estimation through matching with the magnetic field maps of FIG. 3A, in accordance with an example scenario.
Figure 5:
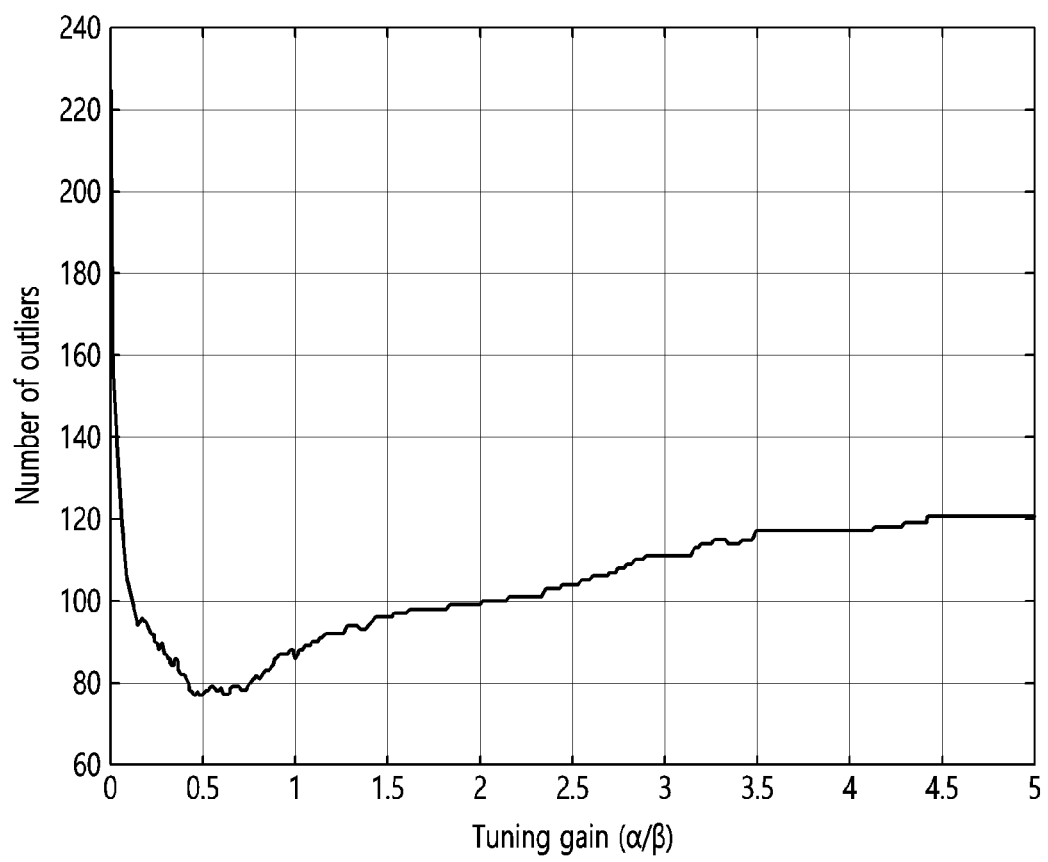
FIG. 5 is a diagram for demonstrating how to determine tuning factors in accordance with an example scenario.
Figure 6:
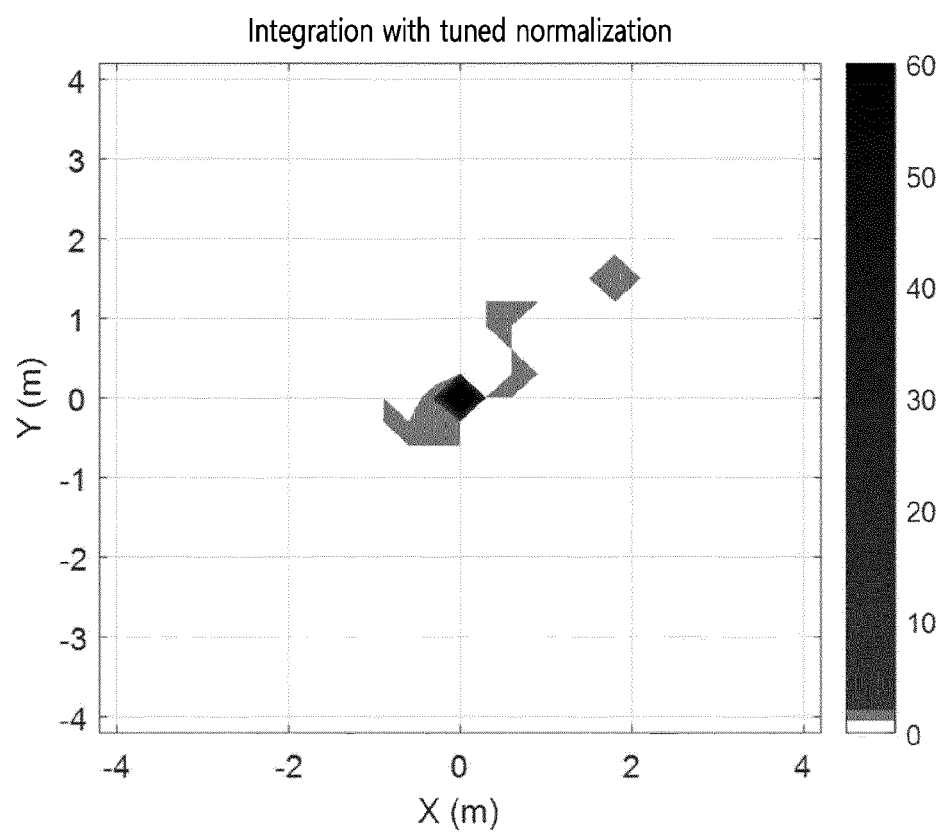
FIG. 6 shows resulting errors in location estimation through matching with the normalization-integrated magnetic field map of FIG. 3B with tuning factors, as well as standard deviations, involved in the normalization therefor, in accordance with an example scenario.

FIG. 4 illustrates errors in location estimation through matching with the magnetic field maps of FIG. 3A, with each error defined as a distance between the zone in which a to-be-positioned pedestrian is actually located and the zone in which the pedestrian is estimated to be located. As depicted in FIG. 4, with the multiple magnetic field sensors arranged for the location estimation, the maximum of the location errors becomes smaller than when only a single one of the sensors is used therefor. FIG. 5 illustrates the number of outliers, as defined as the number of false location estimates, in an example scenario in which tuned normalization is done to apply $N_g$ with a varying ratio of $\alpha$ and $\beta$. Referring to FIG. 5, in this example, the number of outliers reaches its minimum when the tuning gain $\alpha/\beta$ is approximately 0.5 (i.e., around the gain value with $\alpha=\frac{1}{3}$ and $\beta=\frac{2}{3}$). FIG. 6 illustrates errors in location estimation through matching with the normalization-integrated magnetic field map with tuning factors, as well as standard deviations, involved in the normalization therefor, in accordance with an example scenario. As depicted in FIG. 6, with the multiple sensor arrangement arranged for the location estimation, the tuned normalization lowers the maximum of the location errors, as compared to the normalization with the mere use of standard deviations.

Further, Table 2 shows an average error in estimating a pedestrian's indoor location, for each of the above-mentioned four indoor environments, based on each of the foot sensor magnetic field map, the waist sensor magnetic field map, the simply integrated magnetic field map, and the normalization-integrated magnetic field map with the normalization tuned by factors. In addition, Table 3 shows a percentage count of outliers that has occurred in that estimation process.

TABLE 2

| | Average location error (m) | | | |
|---|---|---|---|---|
| Place of experiment | Single sensor (foot) | Single sensor (waist) | Multiple sensors | Multiple sensors (Integration with tuned normalization) |
| Huge hall | 1.9052 | 1.3411 | 0.7017 | 0.5087 |
| Basement hall | 2.0418 | 1.2413 | 0.4574 | 0.3951 |
| Elevator lobby corridor | 0.8890 | 0.8749 | 0.4184 | 0.3123 |
| Narrow corridor | 1.6848 | 7.6941 | 0.9190 | 0.2939 |
| Average | 1.6302 | 2.7879 | 0.6241 | 0.3775 |

TABLE 3

| Place of experiment | Count of outliers (%) | | | |
| --- | --- | --- | --- | --- |
| | Single sensor (foot) | Single sensor (waist) | Multiple sensors | Multiple sensors (Integration with tuned normalization) |
| Huge hall | 88 | 78 | 46 | 35 |
| Basement hall | 87 | 79 | 34 | 25 |
| Elevator lobby corridor | 66 | 81 | 27 | 29 |
| Narrow corridor | 72 | 76 | 38 | 30 |
| Average | 78.25 | 78.5 | 36.25 | 29.75 |

As can be seen from above, the normalization-integrated magnetic field map results in a reduced number of outliers, and thus a reduced average location error, with the normalization involving tuning factors as well as standard deviations.

Example Positioning Apparatus

Figure 7:
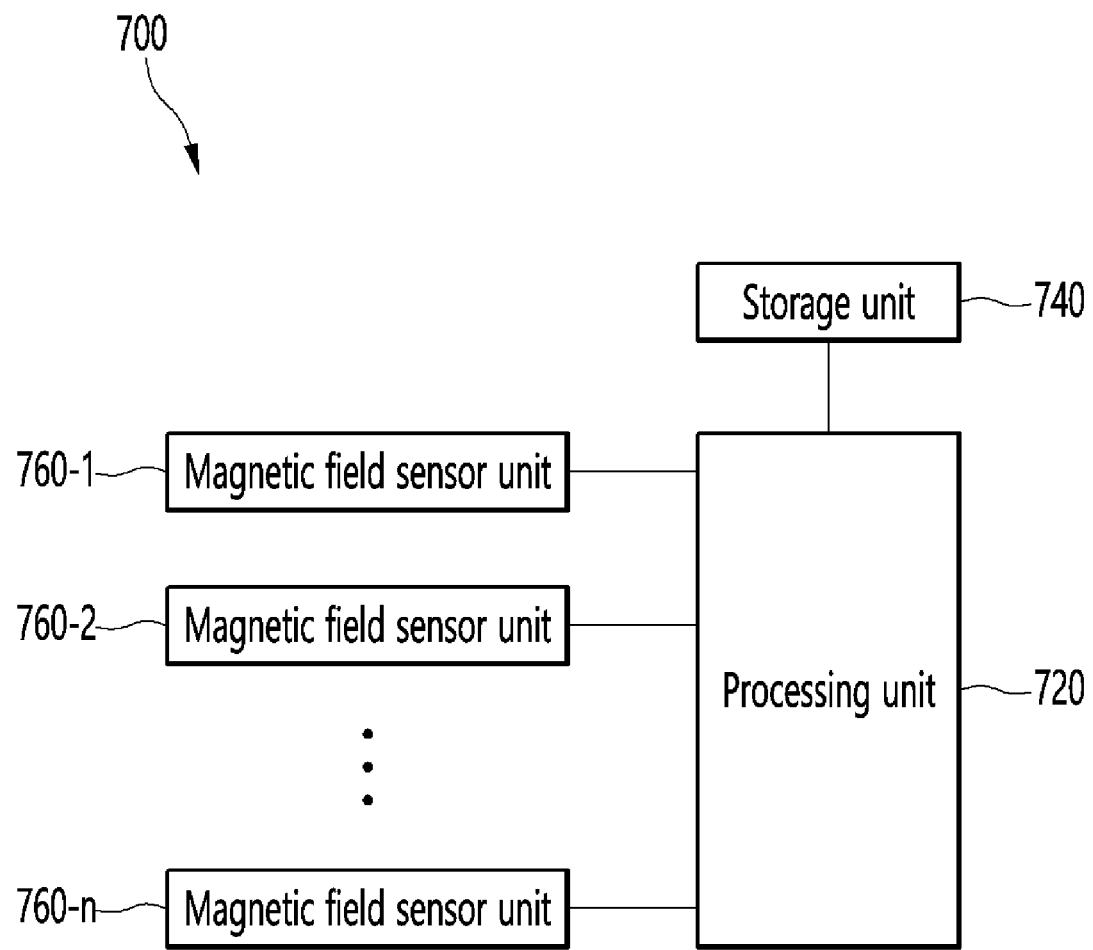
FIG. 7 depicts an example of an apparatus that is capable of positioning an object present on an indoor area, in accordance with some examples of the present disclosure.

Referring to FIG. 7, an example of a positioning apparatus is shown and designated 700. For example, positioning apparatus 700, or components thereof, may include, implement, or be included within a device suitable for performing an indoor positioning process, e.g., indoor positioning process 100.

As shown in FIG. 7, example positioning apparatus 700 includes a processing unit 720, a storage unit 740, and a plurality of magnetic field sensor units 760-1, 760-2, . . . , 760-n, which may also be referred to herein individually as magnetic field sensor unit 760 or collectively as magnetic field sensor units 760. In some example implementations, processing unit 720 may include processing circuitry to control operations of positioning apparatus 120. For example, processing unit 720 may include a central processing unit (CPU), a digital signal processor (DSP), a graphics processing unit (GPU), a processor core, a microprocessor, a micro-controller, a field-programmable gate array (FPGA), an application specific integrated circuit (ASIC), other hardware and logic circuits, or any suitable combination thereof.

In some example implementations, storage unit 740 may include any non-transitory computer-readable storage medium to store computer executable instructions or program codes, program data and/or another suitable form of information in a form readable by, e.g., processing unit 720. For example, storage unit 740 may include read-only memory (ROM), random-access memory (RAM), volatile memory, non-volatile memory, removable memory, non-removable memory, hard disk, flash memory, a magnetic disk storage medium, an optical disk storage medium, other storage devices and storage media, or any suitable combination thereof. Processing unit 710 may then execute computer executable instructions stored in storage unit 720. The instructions, when executed by processing unit 710, may cause positioning apparatus 700, e.g., processing unit 710, to perform any one or more of the operations described herein, for example, at least some operations of example process 100.

In some example implementations, the plurality of magnetic field sensor units 760-1, 760-2, . . . , 760-n may construct a sensing mechanism which is capable of sensing data regarding a surrounding magnetic field. For example, each of the plurality of magnetic field sensor units 760-1, 760-2, . . . , 760-n may include a magnetic field sensor, e.g., a three axis magnetic field sensor, mountable to a part of an object to measure the magnetic field surrounding the object. Each of the plurality of magnetic field sensor units 760-1, 760-2, . . . , 760-n may be communicatively coupled to processing unit 720 to send a respective output signal to processing unit 720. In a particular example, the magnetic field measurement outputted from each of the plurality of magnetic field sensor units 760-1, 760-2, . . . , 760-n, that is, the data regarding the magnetic field sensed by that magnetic field sensor unit, may represent a strength and a direction of the magnetic field.

Each of the units of example positioning apparatus 700 may be configured for positioning of the object, if located in an indoor area, as described in detail below.

In some examples, storage unit 740 may have stored therein a magnetic field map for the indoor area, e.g., a two-dimensional floor area such as a first-floor area of a building. The magnetic field map may include data regarding the magnetic field present throughout the given area. For example, the indoor area may include a number of sub-areas, e.g., grid-shaped zones, and the magnetic field map may be configured for use, e.g., by processing unit 720, in obtaining a plurality of premeasurement-based norms of the magnetic field for each of the sub-areas. In a particular example, the magnetic field map may include a multi-dimensional vector corresponding to each sub-area, each element of which vector is a value calculated as a norm of the magnetic field based on a result of premeasuring the magnetic field in that sub-area in a different manner, e.g., at a different height. Accordingly, for a given one of the sub-areas, the plurality of its corresponding premeasurement-based norms may be obtained, e.g., by processing unit 720, from the magnetic field map.

In some examples, the plurality of magnetic field sensor units 760-1, 760-2, . . . , 760-n may be configured for use, e.g., by processing unit 720, in obtaining a plurality of magnetic field norms for the location of the object in the indoor area. For example, each of the plurality of magnetic field sensor units 760-1, 760-2, . . . , 760-n may be arranged to measure the magnetic field at a different height while having the object mounted thereto, e.g., with each magnetic sensor unit 760 mounted to a different part of the object. Accordingly, a norm of the magnetic field as measured by each of the plurality of magnetic field sensor units 760-1, 760-2, . . . , 760-n may be obtained. In other words, based on results of measuring the magnetic field produced at the location of the object in the indoor area in different manners, a plurality of norms may be obtained, each of which is a magnetic field norm calculated based on the measurement of the magnetic field by a corresponding one of the magnetic field sensor units 760.

In some example implementations, the operation of obtaining the plurality of premeasurement-based norms using the magnetic field map may be based on the same underlying principles and procedures as the subsequent operation of obtaining the plurality of magnetic field norms. For example, each of the plurality of premeasurement-based norms may correspond to one of the plurality of magnetic field norms, and thus be a norm of the magnetic field premeasured with the same magnetic field sensor unit arrangement as when subsequently obtaining the corresponding magnetic field norm after the magnetic field map is configured, that is, with the same magnetic field sensor unit arrangement as the magnetic field sensor unit 760-1, 760-2, . . . , or 760-n with which that magnetic field norm is then obtained. For example, the sensors may be arranged for measurement of the magnetic field at their respective different heights, including, e.g., one for measurement at a foot-height and one for measurement at a waist-height. Further, the plurality of premeasurement-based norms and the plurality of magnetic field norms may be obtained according to the same norm calculation, e.g., L2-norm calculation.

In some examples, processing unit 720 may be configured to match the plurality of magnetic field norms with the magnetic field map to estimate the location of the object as a particular one of the sub-areas of the indoor area. For example, the matching, as performed by processing unit 720, may include calculating a difference between a vector whose elements include the plurality of premeasurement-based norms and another vector whose elements include the plurality of magnetic field norms. In one example, the calculation includes calculating a difference between each premeasurement-based norm and its corresponding magnetic field norm.

In some example implementations, a norm value which is an element of each of the vectors to be so matched may be obtained by applying a certain normalization to an unnormalized norm of a given magnetic field. This normalization may prevent a result of using multiple magnetic field sensors for indoor positioning from being affected overwhelmingly by one of the sensors which senses a much stronger distortion to the magnetic field, as compared to the remaining of the sensors. For example, as defined in Eq. 6, each of the plurality of magnetic field norms is a product of: the unnormalized norm of the magnetic field measured by its corresponding one of the plurality of magnetic field sensor units 760-1, 760-2, . . . , 760-$n$; an inverse of its respective predetermined standard deviation; and its respective tuning factor. Also, the magnetic field map may be correspondingly configured according to Eq. 6.

Further, for each of the plurality of magnetic field norms, the respective standard deviation may be predetermined to be the following value: a standard deviation of a norm of the magnetic field premeasured with the same magnetic field sensor unit arrangement as the magnetic field sensor unit 760-1, 760-2, . . . , or 760-$n$ with which that magnetic field norm is obtained. For example, each of the plurality of premeasurement-based norms may correspond to one of the plurality of magnetic field norms, and have a standard deviation which is the same as that of the corresponding magnetic field norm.

Still further, for each of the plurality of magnetic field norms, the respective tuning factor may be predetermined based on a percentage count of outliers, e.g., a percentage of locations each of which, if for a respective one of the plurality of the sub-areas, in the same manner of matching between those magnetic field norm and the magnetic field map, a plurality of additional premeasurement-based norms of the magnetic field is matched with the magnetic field map, is estimated as a different one of the plurality of the sub-areas than that respective sub-area. For example, the tuning factor may be predetermined to minimize the percentage of locations. Refer also to the above descriptions with reference to, e.g., FIG. 5.

Example Computing Environment

The apparatuses, devices, machines, etc. discussed herein may be computing devices such as any suitable type of computers that may include one or more processors, a computer readable storage medium that is readable by the processor(s), and various peripherals. For example, the processor may include a digital signal processor (DSP), a central processing unit (CPU), a graphics processing unit (GPU), a processor core, a microprocessor, a micro-controller, a field-programmable gate array (FPGA), an application specific integrated circuit (ASIC), a radio-frequency integrated circuit (RFIC), other hardware and logic circuits, or any suitable combination thereof. The computer-readable storage medium may store computer executable instructions that when executed by a processor, causes a computer, e.g., the processor, to perform some operations according to an embodiment of the present invention. For example, the computer-readable storage medium may include read-only memory (ROM), random-access memory (RAM), volatile memory, non-volatile memory, removable memory, non-removable memory, hard disk, flash memory, a magnetic disk storage medium, an optical disk storage medium, other storage devices and storage media, or any suitable combination thereof. For example, the peripherals may include a variety of input/output (I/O) devices, such as sensors, communications interface cards, and the like.

In some examples, the operations, techniques, processes, or certain aspects or portions thereof, described herein may take the form of computer program code embodied in computer-readable storage media. The computer-readable storage medium may include program instructions, local data files, local data structures, or the like, alone or in combination. One or more programs may implement or utilize the operations, techniques, processes, or any aspects or portions thereof, disclosed herein. Such programs may be implemented in any type of, e.g., compiled or interpreted, programming language, such as assembly, that is executable by a computer, such an assembly, machine language, procedural language, object-oriented language, and the like, and may be combined with hardware implementation. The term "computer readable-storage medium" encompasses any medium that is capable of storing instructions that upon execution thereof, causes a computing device to perform any one or more of the disclosed techniques, and of storing data structures for use by or associated with such instructions. Examples of the computer-readable storage medium include, but is not limited to, magnetic media, such as a hard disk, a floppy disk, and a magnetic tape, optical recording media, such as a CD-ROM and a DVD, magneto-optical media, such as a floptical disk, and memory devices, such as ROM, RAM, flash memory, solid-state memory.

While some examples have been described in detail above, these examples should be considered as illustrative and not restrictive. It will be apparent to one of ordinary skill in the art that various changes in form and detail may be made therein without departing from the spirit and scope of the present disclosure. Thus, it is intended that the present disclosure covers all such modifications provided they come within the scope of the appended claims and their equivalents.

What is claimed is:

1. An apparatus, comprising:
a storage unit having stored therein a magnetic field map of an indoor area comprising a plurality of sub-areas;
a plurality of magnetic field sensor units, each of the plurality of magnetic field sensor units being arranged to be mounted on an object to measure a magnetic field at a different height; and
a processing unit to match a plurality of magnetic field norms with the magnetic field map to estimate a location of the object as one of the plurality of sub-areas, each of the plurality of magnetic field norms being a norm of the magnetic field measured by a corresponding one of the plurality of magnetic field sensor units, wherein each of the plurality of magnetic field norms is a product of: an unnormalized norm of the magnetic field measured by the corresponding magnetic field sensor unit; an inverse of a respective predetermined standard deviation; and a respective tuning factor.

2. The apparatus of claim 1, wherein the object is a human being, and wherein the plurality of magnetic sensor units comprises a first magnetic sensor unit and a second magnetic sensor unit which are respectively mountable to a waist and a foot of the human being.

3. The apparatus of claim 1, wherein the magnetic field map is configured for use in obtaining, for each of the plurality of sub-areas, a plurality of premeasurement-based norms of the magnetic field, and wherein the matching further comprises calculating a difference between a first vector whose elements comprise the plurality of premeasurement-based norms and a second vector whose elements comprise the plurality of magnetic field norms.

4. The apparatus of claim 1, wherein the respective predetermined standard deviation is a standard deviation of a norm of the magnetic field premeasured with a magnetic field sensor unit arrangement identical to that of the corresponding magnetic field sensor unit.

5. The apparatus of claim 1, wherein the respective predetermined tuning factor is a factor which is predetermined based on a percentage of locations each of which, if for a respective one of the plurality of the sub-areas, a plurality of additional premeasurement-based norms of the magnetic field is matched with the magnetic field map in a same manner of matching between said each magnetic field norm and the magnetic field map, is estimated as a different one of the plurality of the sub-areas than the respective sub-area.

6. A method performed by a device comprising a hardware processor to perform indoor positioning, comprising:

obtaining, using a plurality of magnetic field sensor units, a plurality of magnetic field norms, each of the plurality of magnetic field sensor units being arranged to be mounted on an object to measure a magnetic field at a different height, each of the plurality of magnetic field norms being a norm of the magnetic field measured by a corresponding one of the plurality of magnetic field sensor units; and matching the plurality of magnetic field norms with a magnetic field map of an indoor area comprising a plurality of sub-areas to estimate a location of the object as one of the plurality of sub-areas, wherein each of the plurality of magnetic field norms is a product of: an unnormalized norm of the magnetic field measured by the corresponding magnetic field sensor unit; an inverse of a respective predetermined standard deviation; and a respective tuning factor.

7. The method of claim 6, wherein the object is a human being, and wherein the plurality of magnetic sensor units comprise a first magnetic sensor unit and a second magnetic sensor unit which are respectively mountable to a waist and a foot of the human being.

8. The method of claim 6, further comprising: using the magnetic field map to obtain, for each of the plurality of sub-areas, a plurality of premeasurement-based norms of the magnetic field, wherein the matching further comprises calculating a difference between a first vector whose elements comprise the plurality of premeasurement-based norms and a second vector whose elements comprise the plurality of magnetic field norms.

9. The method of claim 6, wherein the respective predetermined standard deviation is a standard deviation of a norm of the magnetic field premeasured with a magnetic field sensor unit arrangement identical to that of the corresponding magnetic field sensor unit.

10. The method of claim 6, wherein the respective predetermined tuning factor is a factor which is predetermined based on a percentage of locations each of which, if for a respective one of the plurality of the sub-areas, a plurality of additional premeasurement-based norms of the magnetic field is matched with the magnetic field map in a same manner of matching between said each magnetic field norm and the magnetic field map, is estimated as a different one of the plurality of the sub-areas than the respective sub-area.

* * * * *